No. 690,861.  
W. H. HOYT.  
GAME BALL.  
(Application filed Mar. 22, 1901.)  
Patented Jan. 7, 1902.
(No Model.)
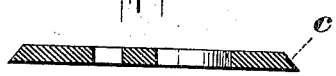
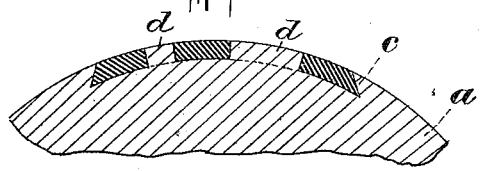
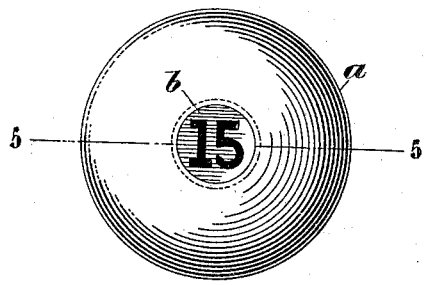
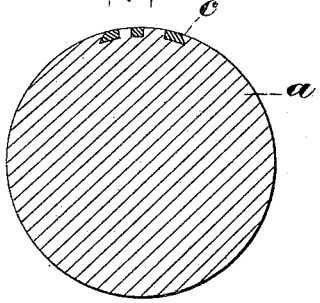
WITNESSES:
INVENTOR  
William H. Hoyt  
BY  
ATTORNEYS

United States Patent Office.

WILLIAM H. HOYT, OF WYOMING, NEW JERSEY, ASSIGNOR TO THE BURT COMPANY, OF MILBURN, NEW JERSEY, A CORPORATION OF NEW JERSEY.

GAME-BALL.

SPECIFICATION forming part of Letters Patent No. 690,861, dated January 7, 1902.

Application filed March 22, 1901. Serial No. 52,273. (No model.)

*To all whom it may concern:*

Be it known that I, WILLIAM H. HOYT, a citizen of the United States, residing in Wyoming, Essex county, State of New Jersey, have invented certain new and useful Improvements in Game-Balls, of which the following is a specification.

My invention relates to improvements in game-balls and other solid objects.

In the accompanying drawings I have shown a game-ball in which my invention is embodied.

In the drawings, Figure 1 is a face view of the spot of the ball. Fig. 2 is a section on line 2 2 of the spot. Fig. 3 is a fragmentary sectional view of a portion of the ball. Fig. 4 is a view of the ball, and Fig. 5 is a section on line 5 5 of the ball.

In the drawings, $a$ represents a ball-body made of plastic material by pressure in a mold. In the side of the ball is a spot $b$, preferably having perforated figures, letters, or other designations. This spot is made of plastic material and is shown as having beveled edges $c$. In forming the ball or other object the spot is placed in the mold with the material of the ball or other object and the whole is integrated by heat and pressure. Under the influence of the heat and pressure the plastic material of the ball-body flows over the edges $c$ of the spot and through the apertures therein, thus anchoring the spot firmly in the ball. It will be observed that those portions $d$ of the material of the ball-body which extend through the apertures of the spot $b$ are wedge-shaped or tapering from the surface of the ball inward by reason of the fact that the side walls of the apertures, which are parallel when the spot is flat, converge when the spot is bent in the ball-forming stage. When the surface of the body bearing the spot is flat, this converging of the walls of the aperture in the form of spot shown will not take place, but the numerals may be countersunk. It is not essential that any numerals at all be employed, as the undercut edge $c$ of the spot will suffice to anchor the spot firmly in place.

Having described my invention, what I claim, and desire to secure by Letters Patent, is—

A game-ball composed of plastic material and having an apertured spot of plastic material set therein, the walls of the aperture in the spot extending radially so as to converge toward the center of the ball and to stand normally to the exposed surface of the spot, and the outer walls of the spot converging outwardly and extending obliquely to the exposed surface of the spot, the material of the ball overlapping the edge of the spot and also extending into the aperture of the spot, whereby the spot will be firmly anchored in place.

W. H. HOYT.

Witnesses:
   S. D. E. MORSE,
   OTTO V. SCHRENK.